United States Patent

Shinyama et al.

[11] Patent Number: 6,060,195
[45] Date of Patent: May 9, 2000

[54] NON-SINTERED NICKEL ELECTRODE FOR ALKALINE STORAGE BATTERY

[75] Inventors: Katsuhiko Shinyama, Higashiosaka; Reizo Maeda; Yoshinori Matsuura, both of Hirakata; Mitsuzo Nogami, Itano-gun; Ikuo Yonezu; Koji Nishio, both of Hirakata, all of Japan

[73] Assignee: Sanyo Electric Co., Ltd., Osaka, Japan

[21] Appl. No.: 09/124,916

[22] Filed: Jul. 30, 1998

[30] Foreign Application Priority Data

Sep. 24, 1997 [JP] Japan ................................ 9-278117

[51] Int. Cl.$^7$ ............................. H01M 4/32; H01M 4/48
[52] U.S. Cl. .................... 429/223; 429/231.1; 429/231.3
[58] Field of Search ............................. 429/223, 231.1, 429/231.3

[56] References Cited

U.S. PATENT DOCUMENTS 5,506,076  4/1996  Miyamoto et al. .
5,707,764  1/1998  Miyamoto et al. .

FOREIGN PATENT DOCUMENTS

A10672622   9/1995  European Pat. Off. .
0 833397 A1 4/1998  European Pat. Off. ......... H01M 4/32
A10833397   4/1998  European Pat. Off. .
62-234867  10/1987  Japan .
103974      4/1994  Japan .
073877      3/1995  Japan .
195198      7/1996  Japan .
777417      6/1957  United Kingdom .

*Primary Examiner*—Maria Nuzzolillo
*Assistant Examiner*—Angela J. Martin
*Attorney, Agent, or Firm*—Birch, Stewart, Kolasch & Birch, LLP

[57] ABSTRACT

In the non-sintered nickel electrode for an alkaline storage battery according to the present invention, the active material powder is made up of composite particles, each comprising a nickel hydroxide-containing core particle and a shell layer coating the nickel hydroxide-containing core particle, the shell layer containing a bismuth-containing compound, or is made up of composite particles, each comprising a nickel hydroxide-containing core particle, an inner shell layer coating the nickel hydroxide-containing core particle and an outer shell layer coating the inner shell layer, the inner shell layer containing a bismuth-containing compound and the outer shell layer containing cobalt metal, cobalt monoxide, cobalt hydroxide, cobalt oxyhydroxide or a sodium-containing cobalt compound prepared by adding an aqueous solution of sodium hydroxide to cobalt metal, cobalt monoxide, cobalt hydroxide or cobalt oxyhydroxide to obtain a mixture and heat-treating the mixture in the presence of oxygen. Provided is a non-sintered nickel electrode for an alkaline storage battery, having a high active material utilization rate not only when charged at normal temperatures but also when charged at high temperatures, and having good charge-discharge cycle characteristics.

18 Claims, No Drawings

6,060,195

NON-SINTERED NICKEL ELECTRODE FOR ALKALINE STORAGE BATTERY

This application claims the priority of Japanese Patent Application No. 9-278117 filed on Sep. 24, 1997.

BACKGROUND OF THE INVENTION

1. Field of the Invention

The present invention relates to a non-sintered nickel electrode for an alkaline storage battery which comprises an active material powder made up of composite particles, and to an alkaline storage battery including the non-sintered nickel electrode as its positive electrode, and more specifically to the improvement of the composite particles for the purpose of providing a non-sintered nickel electrode for an alkaline storage battery, and an alkaline storage battery including the electrode as its positive electrode, having a high active material utilization rate not only when charged at normal temperatures but also when charged at high temperatures, and having good charge-discharge characteristics.

2. Description of the Prior Art

As a positive electrode for a nickel-hydrogen storage battery or a nickel-cadmium storage battery, a sintered nickel electrode fabricated by sintering a nickel powder onto a perforated steel substrate and the like and impregnating the resulting plaque with an active material (nickel hydroxide) has been well known.

To ensure an increased impregnation with the active material for a sintered nickel electrode, it is necessary to employ a sintered substrate of increased porosity. However, since the inter-particle bond of sintered nickel is weak, increasing the porosity of the substrate enhances the tendency for the nickel particles to be dislodged from the sintered substrate. For practical purposes, therefore, the porosity of the sintered substrate cannot be increased beyond 80%, so that the sintered nickel electrode has the drawback that the impregnation amount of active material is limited. In addition, since the pore size of the sintered nickel is generally as small as 10 $\mu$m or less, the impregnation of the sintered substrate with the active material requires the time-consuming dip method which involves several immersion cycles.

For the above reasons, a non-sintered nickel electrode, represented by a paste-type nickel electrode, has been proposed recently. The paste-type nickel electrode is fabricated by impregnating a high-porosity substrate (with a porosity of 95% or greater) with a paste prepared by kneading an active material (nickel hydroxide) and a binder (such as an aqueous solution of methyl cellulose) together. Since a high-porosity substrate can be used for the paste-type nickel electrode, not only the impregnation amount of active material can be increased, but also the impregnation procedure is facilitated.

However, when such a high-porosity substrate is used for increasing the impregnation amount of active material in a paste-type nickel electrode, the conductive capacity of the substrate as a current collector deteriorates, so that the active material utilization rate, i.e. utilization efficiency of active material is decreased. Moreover, when charging is carried out at high temperatures, since an oxygen-generating reaction takes place as a side reaction, nickel hydroxide cannot be oxidized to nickel oxyhydroxide sufficiently, and thus the active material utilization rate is decreased.

In order to increase the active material utilization rate, there has been proposed a paste-type nickel electrode using a composite active material consisting of nickel hydroxide, zinc or a zinc compound (such as ZnO), cobalt or a cobalt compound (such as CoO and Co(OH)$_2$) and a bismuth compound (such as Bi$_2$O$_3$) (see JP-A-8-195198). The addition of a bismuth compound was intended to increase the oxygen overpotential of the nickel electrode at high temperatures, and to improve the active material utilization rate when charging is carried out at high temperatures.

However, investigations made by the present inventors revealed the drawback of the above conventional paste-type nickel electrode that the active material utilization rate is insufficient when charging is carried out at high temperatures, and that charge-discharge cycle characteristics are poor since the effect by the addition of a bismuth compound is lowered rapidly in charge-discharge cycles, that is, the capacity lowers in a short period of time.

Therefore, it is a primary object of the present invention to provide a non-sintered nickel electrode for an alkaline storage battery having a high active material utilization rate not only when charging is carried out at normal temperatures but also when it is carried out at high temperatures, and still having good charge-discharge cycle characteristics, and to provide an alkaline storage battery including such a non-sintered nickel electrode as its positive electrode.

SUMMARY OF THE INVENTION

The non-sintered nickel electrode for an alkaline storage battery according to the present invention (hereinafter referred to as "First Electrode") comprises an active material powder made up of composite particles each comprising a nickel hydroxide-containing core particle and a shell layer coating the nickel hydroxide-containing core particle, the shell layer containing a bismuth-containing compound.

Another non-sintered nickel electrode for an alkaline storage battery according to the present invention (hereinafter referred to as "Second Electrode") comprises an active material powder made up of composite particles each comprising a nickel hydroxide-containing core particle, an inner shell layer coating the nickel hydroxide-containing core particle, the inner shell layer containing a bismuth-containing compound, and an otter shell layer coating the inner shell layer, the outer shell layer containing cobalt metal, cobalt monoxide, cobalt hydroxide, cobalt oxyhydroxide or a sodium-containing cobalt compound prepared by adding an aqueous solution of sodium hydroxide to cobalt metal, cobalt monoxide, cobalt hydroxide, or cobalt oxyhydroxide to obtain a mixture, and heat-treating the mixture in the presence of oxygen. In this description, First Electiode and Second Electrode may be collectively referred to as the present electrode. The alkaline storage battery according to the present invention is an alkaline storage battery including First Electrode or Second Electrode as its positive electrode.

The active material powder of First Electrode is made up of composite particles each comprising a nickel hydroxide-containing core particle (core particle containing nickel hydroxide), the nickel hydroxide-containing core particle being coated by a shell layer containing a bismuth-containing compound.

The nickel hydroxide-containing core particle includes not only a single-component particle made up exclusively of nickel hydroxide but also a particle (solid solution particle) in which at least one element selected from the group consisting of cobalt, zinc, cadmium, calcium, manganese, magnesium, bismuth, aluminum, lanthanides and yttrium is dissolved. The dissolution of one or more elements described above in nickel hydroxide suppresses the swelling of the non-sintered nickel electrode in the charge process.

The bismuth-containing compound constituting the shell layer includes composite hydroxides of bismuth and cobalt; composite oxides of bismuth and cobalt; composite hydroxides of bismuth and nickel; composite oxides of bismuth and nickel; hydroxides of bismuth ($Bi(OH)_3$, $BiOOH$, etc.); oxides of bismuth ($Bi_2O_3$, $BiO$, etc.); $(BiO)_2CO_3$; $Bi_2(SO_4)_3$; $(BiO)_2SO_4$; $BiS$; $Bi_2S_3$; $BiF_3$; and $BiNaO_3$.

The method for forming the shell layer containing bismuth hydroxide ($Bi(OH)_3$) (bismuth hydroxide-containing shell layer) on the nickel hydroxide-containing core particle includes the alkali deposition method in which a nickel hydroxide-containing core powder is added to an aqueous solution of a bismuth salt (such as an aqueous solution of bismuth sulfate), an aqueous solution of an alkali (such as an aqueous solution of sodium hydroxide) is added dropwise to adjust the pH of the aqueous solution to 9–12, and then the mixture is stirred for a predetermined time while maintaining the pH at an almost constant value by adding the aqueous solution of alkali dropwise when the pH is lowered somewhat, to allow bismuth hydroxide to deposit onto the surface of the nickel hydroxide-containing core particle. In this alkali deposition method, when an aqueous solution of a mixture of a bismuth salt and a cobalt salt is used in place of an aqueous solution of a bismuth salt, a shell layer containing a composite hydroxide of bismuth and cobalt can be formed on the nickel hydroxide-containing core particle.

The bismuth hydroxide-containing shell layer also can be formed by a mechanical charging method comprising dry-mixing powdery core particles with powdery bismuth hydroxide in an inert gas using a compression grinding mill. If, in the above mechanical charging method, other bismuth-containing compounds described above are used in lieu of bismuth hydroxide, a shell layer containing the respective bismuth-containing compounds can be formed on the core particle.

The preferred bismuth-containing compounds are a composite hydroxide and composite oxide of bismuth and cobalt, and a hydroxide and oxide of bismuth. The preferred composite hydroxide and composite oxide of bismuth and cobalt are a sodium-containing composite hydroxide and sodium-containing composite oxide of bismuth and cobalt prepared by adding an aqueous solution of sodium hydroxide to a sodium-free composite hydroxide or sodium-free composite oxide of bismuth and cobalt to obtain a mixture, and heat-treating the mixture in the presence of oxygen. The mere addition of an aqueous solution of sodium hydroxide does not provide a sodium-containing shell layer, i.e. heat treatment in the presence of oxygen is essential. The preferred temperature for the heat treatment is 50–200° C. The duration of the heat treatment depends on the quantity and concentration of the aqueous solution of sodium hydroxide used and the temperature of the heat treatment, but it is generally 0.5–10 hours. With respect to the sodium-containing composite hydroxide and sodium-containing composite oxide of bismuth and cobalt, it is preferable for enhancing the electrical conductivity of the inner shell layer that the proportion of sodium atoms to cobalt atoms is 0.2–20% by weight.

When a shell layer containing a composite hydroxide or composite oxide of bismuth and cobalt is formed, the preferred proportion of bismuth to cobalt in the composite hydroxide or composite oxide of bismuth and cobalt is 5–50% by weight, and the preferred proportion of the total amount of bismuth and cobalt atoms in the shell layer to the composite particle made up of the core particle and the shell layer is 1–20% by weight. When a shell layer containing a hydroxide or oxide of bismuth is formed, the preferred proportion of bismuth atoms in the shell layer to the composite particle is 0.1–20% by weight.

When the shell layer contains no cobalt atoms in First Electrode, as in the case of the shell layer containing bismuth hydroxide, it is necessary to add, as a conductive agent, cobalt metal, cobalt monoxide, cobalt hydroxide, cobalt oxyhydroxide, or a sodium-containing cobalt compound prepared by adding an aqueous solution of sodium hydroxide to cobalt metal, cobalt monoxide, cobalt hydroxide or cobalt oxyhydroxide to obtain a mixture, and heat-treating the mixture in the presence of oxygen.

The preferred proportion of the above conductive agents to the active material powder is 1–27% by weight in terms of cobalt atoms. If the proportion is less than 1% by weight, the discharge capacity is lowered due to decline of electrical conductivity, and the charge-discharge cycle characteristics are deteriorated.

On the other hand, if the proportion exceeds 27% by weight, the packed density of nickel hydroxide is lowered and the discharge capacity of the electrode is reduced.

The active material powder of Second Electrode is made up of composite particles each comprising two shell layers coating a nickel hydroxide-containing core particle, i.e. an inner shell layer containing a bismuth-containing compound and an outer shell layer containing cobalt metal, cobalt monoxide, cobalt hydroxide, cobalt oxyhydroxide, or a sodium-containing cobalt compound prepared by adding an aqueous solution of sodium hydroxide to cobalt metal, cobalt monoxide, cobalt hydroxide or cobalt oxyhydroxide to obtain a mixture, and heat-treating the mixture in the presence of oxygen. Second Electrode differs from First Electrode in that the active material powder made up of composite particles each comprising further the outer shell layer containing cobalt metal and the like, the outer shell layer being formed on the inner shell layer (corresponding to the shell layer in First Electrode) containing a bismuth-containing compound is employed.

Examples of the nickel hydroxide-containing core particle and the bismuth-containing compound constituting the inner shell layer are those as described in the description of the core particle and the shell layer of First Electrode and an example of the method for forming the inner shell layer containing a bismuth-containing compound is the same method as that for forming the shell layer containing a bismuth-containing compound in First Electrode. As in the case of First Electrode, the preferred bismuth-containing compounds are a composite hydroxide and composite oxide of bismuth and cobalt, and a hydroxide and oxide of bismuth. The preferred composite hydroxide and composite oxide of bismuth and cobalt are a sodium-containing composite hydroxide and sodium-containing composite oxide of bismuth and cobalt prepared by the respective methods described above.

When an inner shell layer containing a composite hydroxide or composite oxide of bismuth and cobalt is formed, the preferred proportion of bismuth atoms to cobalt atoms in the composite hydroxide or composite oxide of bismuth and cobalt is 5–50% by weight, and the preferred proportion of the total amount of bismuth and cobalt atoms in the inner shell layer to the composite particle made up of the core particle, the inner shell layer and the outer shell layer is 1–20% by weight. Then an inner shell layer containing a hydroxide or oxide of bismuth is formed, the preferred proportion of the total amount of bismuth atoms in the inner shell layer to the composite particle is 0.1–20% by weight.

The composite particle used in Second Electrode comprises, in addition to the inner shell layer described above, an outer shell layer containing cobalt metal, cobalt monoxide, cobalt hydroxide, cobalt oxyhydroxide or a sodium-containing cobalt compound prepared by adding an aqueous solution of sodium hydroxide to cobalt metal, cobalt monoxide, cobalt hydroxide or cobalt oxyhydroxide to obtain a mixture, and heat-treating the mixture in the presence of oxygen.

The method for forming the outer shell layer containing cobalt hydroxide on the inner shell layer includes the alkali deposition method in which powdery core particles each being coated with an inner shell layer are added to an aqueous solution of a cobalt salt (such as an aqueous solution of cobalt sulfate), an aqueous solution of an alkali (such as an aqueous solution of sodium hydroxide) is added dropwise to adjust the pH to 9–12, and then the mixture is stirred for a predetermined time while maintaining the pH at an almost constant value by adding the aqueous solution of the alkali dropwise when the pH is lowered somewhat, to allow cobalt hydroxide to deposit onto the surface of the inner shell layer.

The outer shell layer containing cobalt hydroxide can be formed by the mechanical charging method which comprises dry-mixing powdery nickel hydroxide with powdery cobalt hydroxide in an inert gas using a compression grinding mill. If, in this mechanical charging method, powdery cobalt monoxide or powdery cobalt metal is used in lieu of powdery cobalt hydroxide, an outer shell layer containing cobalt monoxide or cobalt metal can be formed.

The outer shell layer containing cobalt oxyhydroxide can be formed, for example, by forming an outer shell layer containing cobalt hydroxide on the inner shell layer, and then oxidizing the cobalt hydroxide in the outer shell layer with an aqueous solution of hydrogen peroxide heated to about 40° C. The outer shell layer containing a sodium-containing cobalt compound cannot be formed by the mere addition of an aqueous solution of sodium hydroxide to an outer shell layer containing cobalt metal, cobalt hydroxide, cobalt monoxide or cobalt oxyhydroxide, i.e. heat treatment in the presence of oxygen is essential. The preferred temperature for heat-treatment is 50–200° C. If the temperature is lower than 50° C., a large amount of $CoHO_2$ having low electrical conductivity is precipitated; if the temperature exceeds 200° C., a large amount of tricobalt tetraoxide ($Co_3O_4$) is precipitated.

Even if cobalt oxyhydroxide is heat-treated at a temperature below 50° C., $CoHO_2$ is not precipitated, but sodium becomes difficult to be incorporated. Although the time for heat treatment depends on the amount and concentration of the aqueous solution of sodium hydroxide used and the temperature for heat-treatment, it is generally 0.5–10 hours. The chemical structure of the sodium-containing cobalt compound described above has not been clarified by the inventors. However, in view that the compound has a very high electrical conductivity, it is considered to be a compound having a special crystal structure in which sodium is incorporated in the crystal of the cobalt compound, rather than a mixture of the cobalt compound and sodium.

It is preferable for enhancing the electrical conductivity of the outer shell layer that the proportion of sodium atoms to cobalt atoms in the sodium-containing cobalt compound is 0.2–20% by weight.

The preferred proportion of cobalt atoms in the outer shell layer to the composite particle is 1–20% by weight. If this proportion is less than 1% by weight, the charge-discharge cycle characteristics are deteriorated due to lowered electrical conductivity; if this proportion exceeds 20% by weight, the discharge capacity is lowered due to decrease in nickel hydroxide content.

A preferred non-sintered nickel electrode for an alkaline storage battery according to the present invention is a paste-type nickel electrode fabricated by applying a paste containing an active material to a conductive core, and driving the paste. Examples of the conductive cores are foamed nickel, felt-like porous metal fibers, and punching metals. The present invention is also suitably applicable to a tube-type nickel electrode fabricated by filling a tubular metal conductor with an active material, a pocket-type nickel electrode fabricated by filling a pocket-like metal conductor with an active material, and a nickel electrode for a button-type battery fabricated by compression-molding an active material together with a mesh metal conductor.

Examples of alkaline storage batteries in which the present electrode is suitably used as their positive electrodes are a nickel-hydrogen storage battery (negative electrode: hydrogen-absorbing alloy electrode), a nickel-cadmium storage battery (negative electrode: cadmium electrode), and a nickel-zinc storage battery (negative electrode: zinc electrode).

Since, in the present electrode, a shell layer (or an inner shell layer in Second Electrode) containing a bismuth-containing compound is formed on a core particle, the active material utilization rate in charge at high temperatures is high. This is because decrease in oxygen overpotential at high temperatures is suppressed by the above bismuth-containing compound, and the charged electricity is effectively consumed for the charging reaction of the active material. Also, the present electrode is subjected to small decrease in capacity in the process of the charge-discharge cycles. Especially in Second Electrode, since the inner shell layer containing a bismuth-containing compound is further coated with the outer shell layer containing cobalt metal or cobalt compounds, decrease in capacity in the process of the charge-discharge cycle is extremely small. This is probably because the outer shell layer protects the bismuth-containing compound in the inner shell layer from the attack of the electrolyte.

A non-sintered nickel electrode having a high active material utilization rate in charge at high temperatures like the present electrode cannot be obtained by the method disclosed in JP-A-8-195198 in which mere dry-mixing of nickel hydroxide and bismuth or cobalt compounds is conducted. The reason is that since cobalt compounds and the like are deposited on the surface of nickel hydroxide particles together with bismuth compounds in the dry-mixing process, the function of bismuth compounds to suppress decrease in oxygen overpotential at high temperatures cannot be exhibited sufficiently.

DETAILED DESCRIPTION OF THE PREFERRED EMBODIMENTS

The following examples are intended to describe the present invention in further detail, and should by no means be construed as defining the scope of the invention. Therefore, modifications can be made unless the principle of the invention is changed.

EXAMPLE 1

Preparation of Active Material Powder

To 1000 ml of an aqueous solution prepared by dissolving 28.3 g of cobalt sulfate and 1.8 g of bismuth sulfate in water, 100 g of a powder consisting of solid solution particles (solid solution particles containing 3 wt. % zinc and 0.75 wt. % cobalt) in which zinc and cobalt had been dissolved in nickel hydroxide was added, and after the pH of the solution was adjusted to 11 with a 1 M solution of sodium hydroxide, the reaction was carried out while stirring for 1 hour. When the pH dropped somewhat in the course of the reaction, 1 M solution of sodium hydroxide was further added dropwise to maintain the pH of the solution at about 11. The pH was monitored using a glass electrode (pH meter) equipped with an automatic temperature compensator.

The precipitate was collected by filtration, rinsed with water, and dried in vacuo to prepare an active material powder made up of composite particles each consisting of a solid-solution particle (core particle) and a shell layer consisting of a composite hydroxide of bismuth and cobalt. The proportion of bismuth atoms to cobalt atoms in the shell layer, and the proportion of the total amount of bismuth and cobalt atoms to the composite particle determined by atomic absorption analysis were both 10% by weight.

Fabrication of Non-Sintered Nickel Electrode

A paste was prepared by kneading 100 parts by weight of the above active material powder (mean particle diameter: 10 μm) and, as a binder, 20 parts by weight of a 1 wt. % aqueous solution of methyl cellulose. A porous substrate of foamed nickel (porosity: 95%, mean pore diameter: 200 μm) was impregnated with this paste and, after drying, the porous substrate thus impregnated was compression-molded to prepare a non-sintered nickel electrode (First Electrode) a1. The size of First Electrode a1 was 70 mm long×40 mm wide× 0.70 mm thick. This size was adopted for all the non-sintered nickel electrodes fabricated in all the following examples and comparative examples.

Fabrication of Alkaline Storage Battery

The above electrode a1 (positive electrode), a conventional paste-type cadmium electrode (negative electrode), a polyamide non-woven fabric (separator), a 30 wt. % aqueous solution of potassium hydroxide (alkaline electrolyte), a metallic battery case and a metallic lid were used to fabricate an AA-size of alkaline storage battery A1 (nominal battery capacity: about 1000 mAh). The size of the above cadmium electrode was 85 mm long×40 mm wide×0.35 mm thick. The capacity of the negative electrode was set up about 1.5 times the capacity of the positive electrode to determine the characteristics of the non-sintered nickel electrode. For all the batteries fabricated in the following examples and comparative examples, the capacity of the negative electrode was also set up about 1.5 times the capacity of the positive electrode.

EXAMPLE 2

The same active material powder as prepared in Example 1 was mixed with a 35 wt. % aqueous solution of sodium hydroxide in the weight ratio of 1:10, heat-treated at 80° C. for 8 hours, filtered, rinsed with water, and dried at 60° C. to prepare an active material powder made up of composite particles each consisting of a core particle on which a shell layer containing a sodium-containing composite hydroxide of bismuth and cobalt was formed. Then, except that this active material powder was used, the procedures of Example 1 were repeated to fabricate First Electrode a2 and alkaline storage battery A2. The proportion of sodium atoms to cobalt atoms in the sodium-containing cobalt compound determined by atomic absorption analysis was 8% by weight.

EXAMPLE 3

Except that 28.4 g of nickel sulfate was used in lieu of 28.3 g of cobalt sulfate, the procedures of Example 1 were repeated to prepare an active material powder made up of composite particles each consisting of a core particle on which a shell layer consisting of a composite hydroxide of bismuth and nickel was formed. Then, a paste was prepared by kneading 100 parts by weight of the active material powder, 15 parts by weight of a cobalt monoxide powder (CoO), and, as a binder, 20 parts by weight of a 1 wt. % aqueous solution of methyl cellulose. A porous substrate of foamed nickel (porosity: 95%, mean pore diameter: 200 μm) was impregnated with this paste and, after drying, the porous substrate thus impregnated was compression-molded to prepare First Electrode a3. The proportion of bismuth atoms to nickel atoms in the shell layer, and the proportion of the total amount of bismuth and nickel atoms in the shell layer to the composite particle determined by atomic absorption analysis were both 10% by weight. Except that First Electrode a3 as the positive electrode was employed, the procedures of Example 1 were repeated to fabricate alkaline storage battery A3.

EXAMPLE 4

Except that 1000 ml of an aqueous solution prepared by dissolving 1.9 g of bismuth sulfate in water was used in lieu of 1000 ml of the aqueous solution prepared by dissolving 28.3 g of cobalt sulfate and 1.8 g of bismuth sulfate in water, the procedures of Example 1 were repeated to prepare an active material powder made up of composite particles each consisting of a core particle on which a shell layer consisting of bismuth hydroxide was formed. Then, except that this active material powder was used, the procedures of Example 3 were repeated to fabricate First Electrode a4 and alkaline storage battery A4. The proportion of bismuth atoms in the shell layer to the composite particle determined by atomic absorption analysis was 1% by weight.

EXAMPLE 5

To 1000 ml of an aqueous solution prepared by dissolving 14.3 g of cobalt sulfate in water, 100 g of the same active material powder as prepared in Example 1 was added, and after the pH of the solution was adjusted to 11 with a 1 M solution of sodium hydroxide, the reaction was carried out while stirring for 1 hour.

The precipitate was collected by filtration, rinsed with water, and dried in vacuo to prepare an active material powder made up of composite particles each comprising an outer shell layer containing cobalt hydroxide formed on a shell layer (inner shell layer) consisting of a composite hydroxide of bismuth and cobalt.

Then, except that this active material powder was used, the procedures of Example 1 were repeated to fabricate Second Electrode b1 and alkaline storage battery B1. The proportion of cobalt atoms in the outer shell layer to the composite particle determined by atomic absorption analysis was 5% by weight.

EXAMPLE 6

The same active material powder as prepared in Example 5 was mixed with a 35 wt. % aqueous solution of sodium hydroxide in the weight ratio of 1:10, heat-treated at 80° C. for 8 hours, filtered, rinsed with water, and dried at 60° C. to prepare an active material powder made up of composite particles each comprising an outer shell layer consisting of a sodium-containing cobalt compound formed on an inner shell layer. Then, except that this active material powder was used, the procedures of Example 1 were repeated to fabricate Second Electrode b2 and alkaline storage battery B2. The proportion of sodium atoms in the outer shell layer to cobalt atoms in the inner and outer shell layers determined by atomic absorption analysis was 8% by weight.

EXAMPLE 7

To 1000 ml of an aqueous solution prepared by dissolving 14.3 g of cobalt sulfate in water, 100 g of the same active material powder as prepared in Example 3 was added, and after the pH of the solution was adjusted to 11 with a 1 M aqueous solution of sodium hydroxide, the reaction was carried out while stirring for 1 hour. The precipitate was collected by filtration, rinsed with water, and dried in vacuo to prepare an active material powder made up of composite particles each comprising an outer shell layer consisting of cobalt hydroxide formed on a shell layer (inner shell layer) consisting of a composite hydroxide of bismuth and nickel. Then, except that this active material powder was used, the procedures of Example 1 were repeated to fabricate Second Electrode b3 and alkaline storage battery B3. The proportion of cobalt atoms in the outer shell layer to the composite particle determined by atomic absorption analysis was 5% by weight.

EXAMPLE 8

The same active material powder as prepared in Example 7 was mixed with a 35 wt. % aqueous solution of sodium hydroxide in the weight ratio of 1:10, heat-treated at 80° C. for 8 hours, filtered, rinsed with water, and dried at 60° C. to prepare an active material powder made up of composite particles each comprising an outer shell layer containing a sodium-containing cobalt compound formed on an inner shell layer. Then, except that this active material powder was used, the procedures of Example 1 were repeated to fabricate Second Electrode b4 and alkaline storage battery B4. The proportion of sodium atoms in the outer shell layer to cobalt atoms in the outer shell layer determined by atomic absorption analysis was 8% by weight.

EXAMPLE 9

To 1000 ml of an aqueous solution prepared by dissolving 14.3 g of cobalt sulfate in water, 100 g of the same active material powder as prepared in Example 4 was added, and after the pH of the solution was adjusted to 11 with a 1 M aqueous solution of sodium hydroxide, the reaction was carried out while stirring for 1 hour. The precipitate was collected by filtration, rinsed with water, and dried in vacuo to prepare an active material powder made up of composite particles each comprising an outer shell layer containing cobalt hydroxide formed on a shell layer (inner shell layer) containing bismuth hydroxide. Then, except that this active material powder was used, the procedures of Example 1 were repeated to fabricate Second Electrode b5 and alkaline storage battery B5. The proportion of cobalt atoms in the outer shell layer to the composite particles determined by atomic absorption analysis was 5% by weight.

EXAMPLE 10

The same active material powder as prepared in Example 9 was mixed with a 35 wt. % aqueous solution of sodium hydroxide in the weight ratio of 1:10, heat-treated at 80° C. for 8 hours, filtered, rinsed with water, and dried at 60° C. to prepare an active material powder made up of composite particles each comprising an outer shell layer containing a sodium-containing cobalt compound formed on an inner shell layer. Then, except that this active material powder was used, the procedures of Example 1 were repeated to fabricate Second Electrode b6 and alkaline storage battery B6. The proportion of sodium atoms in the outer shell layer to cobalt atoms in the outer shell layer determined by atomic absorption analysis was 8% by weight.

Comparative Example 1

A paste was prepared by kneading 100 parts by weight of the active material powder consisting of solid solution particles (solid solution particles containing 3% by weight of zinc and 0.75% by weight of cobalt) in which zinc and cobalt had been dissolved in nickel hydroxide, 15 parts by weight of a cobalt monoxide powder, 1.5 parts by weight of a bismuth hydroxide $(Bi(OH)_3)$ powder, and, as a binder, 20 parts by weight of a 1 wt. % aqueous solution of methyl cellulose. A porous substrate of foamed nickel (porosity: 95%, mean pore diameter: 200 $\mu$m) was impregnated with this paste and, after drying, the porous substrate thus impregnated was compression-molded to prepare a 20 non-sintered nickel electrode (comparative electrode) c1. Then, except that this comparative electrode c1 was used as the positive electrode, the procedures of Example 1 were repeated to fabricate alkaline storage battery C1.

Comparative Example 2

A paste was prepared by kneading 100 parts by weight of an active material powder consisting of solid solution particles containing 3 wt. % zinc and 0.75 wt. % cobalt in which zinc and cobalt had been dissolved in nickel hydroxide, 15 parts by weight of a cobalt monoxide powder, 1.5 parts by weight of a dibismuth trioxide $(Bi_2O_3)$ powder, and, as a binder, 20 parts by weight of a 1 wt. % aqueous solution of methyl cellulose. A porous substrate of foamed nickel (porosity: 95%, mean pore diameter: 200 $\mu$m) was impregnated with this paste and, after drying, the porous substrate thus impregnated was compression-molded to prepare a non-sintered nickel electrode (comparative electrode) c2. Then, except that this comparative electrode c2 was used as the positive electrode, the procedures of Example 1 were repeated to fabricate alkaline storage battery C2.

Charging Characteristics at High Temperatures and Charge-Discharge Cycle Life of Each Battery Each of the batteries was subjected to a cycle test comprising charging at 25° C. and 100 mA for 16 hours and discharging to 1.0 V at 25° C. and 100 mA as one cycle, and the discharge capacity CP1 (mAh) at the 10th cycle was determined. Then each battery was charged at 50° C. and 100 mA for 16 hours and discharged to 1.0 V at 25° C. and 100 mA, and the discharge capacity CP2 (mAh) at the 11th cycle was determined. The proportion P (%) of the discharge capacity CP2 to the discharge capacity CP1 was calculated for each battery. The proportion P is an indication of charging characteristics at high temperatures. The higher value indicates the higher active material utilization rate in charge at high temperatures.

Also, each battery was subjected to ten cycles of charge-discharge cycle test comprising charging at 25° C. and 100 mA for 16 hours and discharging to 1.0 V at 25° C. and 100 mA as one cycle, and then was subjected to a charge-discharge cycle test comprising charging at 25 ° C. and 1000 mA for 1.2 hours and discharging to 1.0 V at 25° C. and 1000 mA as one cycle, and the number of cycles until the discharge capacity lowered to 60% or below of the discharge capacity CP1 at the 10th cycle was determined and regarded as the charge-discharge cycle life of each battery. The charge capacity CP1 at the 10th cycle, the charge capacity CP2 at the 11th cycle, the proportion P, and the charge-discharge cycle life of each battery are shown in Table 1.

TABLE 1

| Battery | Discharge capacity at 10th cycle (mAh) | Discharge capacity at 11th cycle (mAh) | P (%) | Charge-discharge cycle life (cycle) |
|---|---|---|---|---|
| A1 | 990 | 890 | 90 | 750 |
| A2 | 1000 | 920 | 92 | 720 |
| A3 | 940 | 730 | 78 | 350 |
| A4 | 960 | 820 | 85 | 550 |
| B1 | 980 | 840 | 86 | 800 |
| B2 | 990 | 870 | 88 | 780 |
| B3 | 920 | 670 | 73 | 400 |
| B4 | 930 | 700 | 75 | 380 |
| B5 | 940 | 780 | 83 | 600 |
| B6 | 950 | 800 | 84 | 570 |
| C1 | 900 | 630 | 70 | 200 |
| C2 | 910 | 660 | 72 | 180 |

As Table 1 shows, alkaline storage batteries A1–A4 and B1–B6 using First Electrodes a1–a4 and Second Electrodes b1–b6, respectively had larger proportions P and longer charge-discharge cycle lives than those of storage batteries C1 and C2 using comparative electrodes c1 and c2, respectively.

Relationship of the Proportion of Bismuth Atoms to Cobalt Atoms in the Shell Layer with the Charge Characteristics at High Temperatures and Charge-Discharge Cycle Life Except that each amount of cobalt sulfate and bismuth sulfate used in the formation of the shell layer was changed as shown in Table 2, the procedures of Example 1 were repeated to prepare First Electrodes a5–a13 and alkaline storage batteries A5–A13. Then, each battery was subjected to the test under the same conditions as described above, and the charge capacity at the 10th cycle, the charge capacity at the 11th cycle, the proportion P, and the charge-discharge cycle life of each battery were determined. The results are shown in Table 3. The data of alkaline storage battery A1 fabricated in Example 1 are also shown in Tables 2 and 3.

TABLE 2

| Battery | Amount of cobalt sulfate used for the formation of the shell layer (g) | Amount of bismuth sulfate used for the formation of the shell layer (g) | Proportion of bismuth atoms to cobalt atoms in the shell layer (wt. %) | Proportion of total amount of bismuth and cobalt atoms in the shell layer to the composite particles (wt. %) |
|---|---|---|---|---|
| A5 | 30.9 | 0.2 | 1 | 10 |
| A6 | 30.3 | 0.6 | 3 | 10 |
| A7 | 29.7 | 1.0 | 5 | 10 |
| A1 | 28.3 | 1.8 | 10 | 10 |
| A8 | 25.9 | 3.3 | 20 | 10 |
| A9 | 23.8 | 4.6 | 30 | 10 |
| A10 | 22.1 | 5.7 | 40 | 10 |
| A11 | 20.5 | 6.6 | 50 | 10 |
| A12 | 19.9 | 7.0 | 55 | 10 |
| A13 | 19.2 | 7.4 | 60 | 10 |

TABLE 3

| Battery | Discharge capacity at 10th cycle (mAh) | Discharge capacity at 11th cycle (mAh) | P (%) | Charge-discharge cycle life (cycle) |
|---|---|---|---|---|
| A5 | 990 | 770 | 78 | 750 |
| A6 | 990 | 810 | 82 | 750 |
| A7 | 990 | 880 | 89 | 750 |
| A1 | 990 | 890 | 90 | 750 |
| A8 | 980 | 890 | 91 | 740 |
| A9 | 980 | 900 | 92 | 730 |
| A10 | 970 | 890 | 92 | 720 |
| A11 | 960 | 880 | 92 | 700 |
| A12 | 950 | 870 | 92 | 600 |
| A13 | 930 | 860 | 92 | 550 |

As Table 3 shows, alkaline storage batteries A1 and A7–A11 had large proportions P and long charge-discharge cycle lives, while alkaline storage batteries A5 and A6 had smaller proportions P due to small bismuth content, and alkaline storage batteries A12 and A13 had shorter charge-discharge cycle lives due to small cobalt content. From these results it is preferred, when the shell layer of First Electrode is formed by a composite hydroxide of bismuth and cobalt, that the proportion of bismuth atoms in the shell layer to cobalt atoms is 5–50% by weight.

Relationship of the Proportion of Bismuth and Cobalt Atoms in the Shell Layer to the Composite Particle with the Charge Characteristics at High Temperatures and Charge-Discharge Cycle Life Except that each amount of cobalt sulfate and bismuth sulfate used in the formation of the shell layer was changed as shown in Table 4, the procedures of Example 1 were repeated to prepare First Electrodes a14–a22 and alkaline storage batteries A14–A22.

Then, each battery was subjected to the test under the same conditions as described above, and the charge capacity at the 10th cycle, the charge capacity at the 11th cycle, the proportion P, and the charge-discharge cycle life of each battery were determined. The results are shown in Table 5. The data of alkaline storage battery A1 fabricated in Example 1 are also shown in Tables 4 and 5.

TABLE 4

| Battery | Amount of cobalt sulfate used for the formation of the shell layer (g) | Amount of bismuth sulfate used for the formation of the shell layer (g) | Proportion of bismuth atoms to cobalt atoms in the shell layer (wt. %) | Proportion of total amount of bismuth and cobalt atoms in the shell layer to the composite particles (wt. %) |
|---|---|---|---|---|
| A14 | 1.2 | 0.1 | 10 | 0.5 |
| A15 | 1.9 | 0.1 | 10 | 0.8 |
| A16 | 2.4 | 0.2 | 10 | 1 |
| A17 | 7.5 | 0.5 | 10 | 3 |
| A18 | 13.0 | 0.8 | 10 | 5 |
| A1 | 28.3 | 1.8 | 10 | 10 |
| A19 | 46.7 | 3.0 | 10 | 15 |
| A20 | 69.2 | 4.4 | 10 | 20 |
| A21 | 79.7 | 5.1 | 10 | 22 |
| A22 | 97.5 | 6.3 | 10 | 25 |

TABLE 5

| Battery | Discharge capacity at 10th cycle (mAh) | Discharge capacity at 11th cycle (mAh) | P (%) | Charge-discharge cycle life (cycle) |
|---|---|---|---|---|
| A14 | 900 | 700 | 78 | 800 |
| A15 | 910 | 750 | 82 | 800 |
| A16 | 950 | 820 | 86 | 800 |
| A17 | 960 | 840 | 88 | 800 |
| A18 | 970 | 860 | 89 | 750 |
| A1 | 990 | 890 | 90 | 750 |
| A19 | 990 | 900 | 91 | 700 |
| A20 | 970 | 880 | 91 | 700 |
| A21 | 900 | 820 | 91 | 650 |
| A22 | 870 | 790 | 91 | 550 |

As Table 5 shows, alkaline storage batteries A1 and A16–A20 had large proportions P and long charge-discharge cycle lives, while alkaline storage batteries A14 and A15 had lower active material utilization rates and smaller discharge capacities at the 10th cycle due to small cobalt content in the shell layer. Furthermore, alkaline storage batteries A14 and A15 had smaller proportions P due to small bismuth content in the shell layer. Alkaline storage batteries A21 and A22 had smaller discharge capacities due to small nickel hydroxide content. Also, alkaline storage batteries A21 and A22 had shorter charge-discharge cycle lives. From these results it is preferred, when the shell layer of First Electrode is formed by a composite hydroxide of bismuth and cobalt, that the proportion of the total amount of bismuth and cobalt atoms in the shell layer to the composite particle is 1–20% by weight.

Relationship of the Proportion of Cobalt Metal or Cobalt Compounds to an Active Material Powder with the Charge Characteristics at High Temperatures and Charge-Discharge Cycle Life Except that the amount (parts by weight) of a cobalt monoxide powder added to 100 parts by weight of the active material powder was changed as shown in Table 6, the procedures of Example 4 were repeated to prepare First Electrode a23–a32 and alkaline storage batteries A23–A32. Then, each battery was subjected to the test under the same conditions as described above, and the charge capacity at the 10th cycle, the charge capacity at the 11th cycle, the proportion P, and the charge-discharge cycle life of each battery were determined. The results are shown in Table 7. The data of alkaline storage battery A4 fabricated in Example 4 are also shown in Tables 6 and 7.

TABLE 6

| Battery | Amount of cobalt monoxide added (part by weight) | Proportion of cobalt atoms to the active material powder (wt. %) |
|---|---|---|
| A23 | 0.6 | 0.5 |
| A24 | 1.0 | 0.8 |
| A25 | 1.3 | 1.0 |
| A26 | 6.4 | 5.0 |
| A27 | 12.7 | 10.0 |
| A4 | 15.0 | 11.8 |
| A28 | 19.1 | 15.0 |
| A29 | 28.0 | 22.0 |
| A30 | 34.3 | 27.0 |
| A31 | 38.1 | 30.0 |
| A32 | 40.7 | 32.0 |

TABLE 7

| Battery | Discharge capacity at 10th cycle (mAh) | Discharge capacity at 11th cycle (mAh) | P (%) | Charge-discharge cycle life (cycle) |
|---|---|---|---|---|
| A23 | 880 | 760 | 86 | 370 |
| A24 | 890 | 765 | 86 | 430 |
| A25 | 900 | 770 | 86 | 500 |
| A26 | 920 | 780 | 85 | 520 |
| A27 | 940 | 800 | 85 | 530 |
| A4 | 960 | 820 | 85 | 550 |
| A28 | 950 | 810 | 85 | 560 |
| A29 | 950 | 800 | 84 | 570 |
| A30 | 930 | 770 | 83 | 570 |
| A31 | 900 | 730 | 81 | 570 |
| A32 | 870 | 690 | 79 | 570 |

As Table 7 shows, alkaline storage batteries A23 and A24 had smaller discharge capacity and shorter charge-discharge cycle life due to the low level of a conductive agent added. Alkaline storage batteries A31 and A32 had smaller discharge capacity due to small nickel hydroxide content. From these results it is preferred, when the shell layer of First Electrode is formed by a cobalt-free bismuth compound, that the level of addition of the cobalt compound in terms of cobalt atoms to the active material powder is 1–27% by weight.

Relationship of the Proportion of Bismuth Atoms to Cobalt Atoms in the Inner Shell Layer with the Charge Characteristics at High Temperatures and Charge-Discharge Cycle Life Except that each amount of cobalt sulfate and bismuth sulfate used in the formation of the inner shell layer was changed as shown in Table 8, the procedures of Example 5 were repeated to prepare Second Electrodes b7–b15 and alkaline storage batteries B7–B15. Then, each battery was subjected to the test under the same conditions as described above, and the charge capacity at the 10th cycle, the charge capacity at the 11th cycle, the proportion P, and the charge-discharge cycle life of each battery were determined. The results are shown in Table 9. The data of alkaline storage battery B1 fabricated in Example 5 are also shown in Tables 8 and 9.

TABLE 8

| Battery | Amount of cobalt sulfate used for the formation of the inner shell layer (g) | Amount of bismuth sulfate used for the formation of the inner shell layer (g) | Proportion of bismuth atoms to cobalt atoms in the inner shell layer (wt. %) | Proportion of total amount of bismuth and cobalt atoms in the inner shell layer to the composite particle (wt. %) |
|---|---|---|---|---|
| B7 | 30.9 | 0.2 | 1 | 9.2 |
| B8 | 30.3 | 0.6 | 3 | 9.2 |
| B9 | 29.7 | 1.0 | 5 | 9.2 |
| B1 | 28.3 | 1.8 | 10 | 9.2 |
| B10 | 25.9 | 3.3 | 20 | 9.2 |
| B11 | 23.8 | 4.6 | 30 | 9.2 |
| B12 | 22.1 | 5.7 | 40 | 9.2 |
| B13 | 20.5 | 6.6 | 50 | 9.2 |
| B14 | 19.9 | 7.0 | 55 | 9.2 |
| B15 | 19.2 | 7.4 | 60 | 9.2 |

TABLE 9

| Battery | Discharge capacity at 10th cycle (mAh) | Discharge capacity at 11th cycle (mAh) | P (%) | Charge-discharge cycle life (cycle) |
| --- | --- | --- | --- | --- |
| B7  | 980 | 730 | 74 | 800 |
| B8  | 980 | 760 | 78 | 800 |
| B9  | 980 | 830 | 85 | 800 |
| B1  | 980 | 840 | 86 | 800 |
| B10 | 970 | 840 | 87 | 790 |
| B11 | 970 | 850 | 88 | 780 |
| B12 | 960 | 840 | 88 | 770 |
| B13 | 950 | 840 | 88 | 750 |
| B14 | 940 | 830 | 88 | 650 |
| B15 | 920 | 810 | 88 | 600 |

As Table 9 shows, alkaline storage batteries B1 and B9–B13 had large proportions P and long charge-discharge cycle lives while alkaline storage batteries B7 and B8 had somewhat smaller proportions P due to small bismuth content in the inner shell layer, and alkaline storage batteries B14 and B15 had shorter charge-discharge cycle lives due to small cobalt content in the inner shell layer. From these results it is preferred, when the inner shell layer of Second Electrode is formed of a composite hydroxide of bismuth and cobalt, that the proportion of bismuth atoms to cobalt atoms in the inner shell layer is 5–50% by weight.

Relationship of the Proportion of Total Amount of Bismuth and Cobalt Atoms in the Inner Shell Layer to the Composite Particle with the Charge Characteristics at High Temperatures and Charge-Discharge Cycle Life Except that each amount of cobalt sulfate and bismuth sulfate used in the formation of the inner shell layer was changed as shown in Table 10, the procedures of Example 5 were repeated to prepare Second Electrodes b16–b24 and alkaline storage batteries B16–B24. Then, each battery was subjected to the test under the same conditions as described above, and the charge capacity at the 10th cycle, the charge capacity at the 11th cycle, the proportion P, and the charge-discharge cycle life of each battery were determined. The results are shown in Table 11. The data of alkaline storage battery B1 fabricated in Example 5 are also shown in Tables 10 and 11.

TABLE 10

| Battery | Amount of cobalt sulfate used for the formation of the inner shell layer (g) | Amount of bismuth sulfate used for the formation of the inner shell layer (g) | Proportion of bismuth atoms to cobalt atoms in the inner shell layer (wt. %) | Proportion of total amount of bismuth and cobalt atoms in the inner shell layer to the composite particle (wt. %) |
| --- | --- | --- | --- | --- |
| B16 | 1.2  | 0.1 | 10 | 0.5  |
| B17 | 1.9  | 0.1 | 10 | 0.7  |
| B18 | 2.4  | 0.2 | 10 | 0.9  |
| B19 | 7.5  | 0.5 | 10 | 2.8  |
| B20 | 13.0 | 0.8 | 10 | 4.6  |
| B1  | 28.3 | 1.8 | 10 | 9.2  |
| B21 | 46.7 | 3.0 | 10 | 13.8 |
| B22 | 69.2 | 4.4 | 10 | 18.4 |
| B23 | 79.7 | 5.1 | 10 | 20.3 |
| B24 | 97.5 | 6.3 | 10 | 23.0 |

TABLE 11

| Battery | Discharge capacity at 10th cycle (mAh) | Discharge capacity at 11th cycle (mAh) | P (%) | Charge-discharge cycle life (cycle) |
| --- | --- | --- | --- | --- |
| B16 | 890 | 660 | 74 | 850 |
| B17 | 900 | 700 | 78 | 850 |
| B18 | 940 | 770 | 82 | 850 |
| B19 | 950 | 800 | 84 | 850 |
| B20 | 960 | 820 | 85 | 800 |
| B1  | 980 | 840 | 86 | 800 |
| B21 | 980 | 850 | 87 | 750 |
| B22 | 960 | 840 | 87 | 750 |
| B23 | 890 | 770 | 87 | 700 |
| B24 | 860 | 750 | 87 | 600 |

As Table 11 shows, alkaline storage batteries B1 and B18–B22 had large proportions P and long charge-discharge cycle lives, while alkaline storage batteries B16 and B17 had lower active material utilization rates and smaller discharge capacities at the 10th cycle due to smaller bismuth content in the inner shell layer. Alkaline storage batteries B23 and B24 had smaller proportions P due to smaller bismuth content in the inner shell layer. Alkaline storage batteries B23 and B24 had smaller discharge capacities due to smaller nickel hydroxide content. Furthermore, alkaline storage batteries B23 and B24 had shorter charge-discharge cycle lives. From these results it is preferred, when the inner shell layer of Second Electrode is formed of a composite hydroxide of bismuth and cobalt, that the proportion of total amount of bismuth and cobalt atoms in the shell layer to the composite particle is 1–20% by weight.

Relationship of the Proportion of Cobalt Atoms in the Outer Shell Layer to the Composite Particle with the Charge Characteristics at High Temperatures and Charge-Discharge Cycle Life Except that the amount of cobalt sulfate used in the formation of the outer shell layer was changed as shown in Table 12, the procedures of Example 5 were repeated to prepare Second Electrodes b25–b33 and alkaline storage batteries B25–B33. Then, each battery was subjected to the test under the same conditions as described above, and the charge capacity at the 10th cycle, the charge capacity at the 11th cycle, the proportion P, and the charge-discharge cycle life of each battery were determined. The results are shown in Table 13. The data of alkaline storage battery B1 fabricated in Example 5 are also shown in Tables 12 and 13.

TABLE 12

| Battery | Amount of cobalt sulfate used for the formation of the outer shell layer (g) | Proportion of cobalt atoms in the outer shell layer to the composite particle (wt. %) |
| --- | --- | --- |
| B25 | 1.3   | 0.5 |
| B26 | 2.1   | 0.8 |
| B27 | 2.7   | 1   |
| B28 | 8.3   | 3   |
| B1  | 14.3  | 5   |
| B29 | 31.2  | 10  |
| B30 | 51.7  | 15  |
| B31 | 76.8  | 20  |
| B32 | 88.6  | 22  |
| B33 | 108.6 | 25  |

TABLE 13

| Battery | Discharge capacity at 10th cycle (mAh) | Discharge capacity at 11th cycle (mAh) | P (%) | Charge-discharge cycle life (cycle) |
|---|---|---|---|---|
| B25 | 980 | 850 | 87 | 620 |
| B26 | 980 | 850 | 87 | 690 |
| B27 | 980 | 850 | 87 | 750 |
| B28 | 980 | 850 | 87 | 780 |
| B1  | 980 | 840 | 86 | 800 |
| B29 | 980 | 840 | 86 | 800 |
| B30 | 970 | 820 | 85 | 800 |
| B31 | 960 | 810 | 84 | 800 |
| B32 | 920 | 750 | 82 | 800 |
| B33 | 880 | 700 | 80 | 800 |

As Table 13 shows, alkaline storage batteries B1 and B27–B31 had large proportions P and long charge-discharge cycle lives, while alkaline storage batteries B25 and B26 had shorter charge-discharge cycle lives due to poor formation of the outer layer. Alkaline storage batteries B32 and B33 had smaller discharge capacities due to smaller nickel hydroxide content. From these results it is preferred, in Second Electrode, that the proportion of cobalt atoms in the outer shell layer to the composite particle is 1–20% by weight.

Relationship of the Proportion of Bismuth Atoms in the Inner Shell Layer to the Composite Particle with the Charge Characteristics at High Temperatures and Charge-Discharge Cycle Life Except that the amount of bismuth sulfate used in the formation of the inner shell layer was changed as shown in Table 14, the procedures of Example 9 were repeated to prepare Second Electrodes b34–b42 and alkaline storage batteries B34–B42. Then, each battery was subjected to the test under the same conditions as described above, and the charge capacity at the 10th cycle, the charge capacity at the 11th cycle, the proportion P, and the charge-discharge cycle life of each battery were determined. The results are shown in Table 15. The data of alkaline storage battery B5 fabricated in Example 9 are also shown in Tables 14 and 15.

TABLE 14

| Battery | Amount of bismuth sulfate used for the formation of inner shell layer (g) | Proportion of bismuth atoms in the inner shell layer to the composite particle (wt. %) |
|---|---|---|
| B34 | 0.09 | 0.05 |
| B35 | 0.15 | 0.08 |
| B36 | 0.2 | 0.1 |
| B37 | 0.9 | 0.5 |
| B5  | 1.9 | 1 |
| B38 | 9.8 | 5 |
| B39 | 21.2 | 10 |
| B40 | 50.3 | 20 |
| B41 | 57.4 | 22 |
| B42 | 69.2 | 25 |

TABLE 15

| Battery | Discharge capacity at 10th cycle (mAh) | Discharge capacity at 11th cycle (mAh) | P (%) | Charge-discharge cycle life (cycle) |
|---|---|---|---|---|
| B34 | 950 | 680 | 72 | 620 |
| B35 | 950 | 730 | 77 | 620 |
| B36 | 950 | 770 | 81 | 620 |
| B37 | 950 | 780 | 82 | 620 |

TABLE 15-continued

| Battery | Discharge capacity at 10th cycle (mAh) | Discharge capacity at 11th cycle (mAh) | P (%) | Charge-discharge cycle life (cycle) |
|---|---|---|---|---|
| B5  | 940 | 780 | 83 | 600 |
| B38 | 930 | 780 | 84 | 580 |
| B39 | 910 | 780 | 86 | 560 |
| B40 | 890 | 780 | 88 | 530 |
| B41 | 830 | 730 | 88 | 400 |
| B42 | 760 | 670 | 88 | 300 |

As Table 15 shows, alkaline storage batteries B5 and B36–B40 had large proportions P and long charge-discharge cycle lives, while alkaline storage batteries B34 and B35 had smaller proportions P due to smaller bismuth content in the inner shell layer. Alkaline storage batteries B41 and B42 had shorter charge-discharge cycle lives due to excessively large bismuth content. From these results it is preferred, when the inner layer of Second Electrode is formed of bismuth hydroxide, that the proportion of bismuth atoms in the inner shell layer to the composite particle is 0.1–20% by weight.

Relationship of the Proportion of Cobalt Atoms in the Outer Shell Layer to the Composite Particle with the Charge Characteristics at High Temperatures and Charge-Discharge Cycle Life Except that the amount of cobalt sulfate used in the formation of the outer shell layer was changed as shown in Table 16, the procedures of Example 9 were repeated to prepare Second Electrodes b43–b51 and alkaline storage batteries B43–B51. Then, each battery was subjected to the test under the same conditions as described above, and the charge capacity at the 10th cycle, the charge capacity at the 11th cycle, the proportion P, and the charge-discharge cycle life of each battery were determined The results are shown in Table 17. The data of alkaline storage battery B5 fabricated in Example 9 are also shown in Tables 16 and 17.

TABLE 16

| Battery | Amount of cobalt sulfate used for the formation of the outer shell layer (g) | Proportion of cobalt atoms in the outer shell layer to the composite particle (wt. %) |
|---|---|---|
| B43 | 1.3 | 0.5 |
| B44 | 2.1 | 0.8 |
| B45 | 4.0 | 1 |
| B46 | 8.3 | 3 |
| B5  | 14.3 | 5 |
| B47 | 31.2 | 10 |
| B48 | 51.7 | 15 |
| B49 | 76.8 | 20 |
| B50 | 88.6 | 22 |
| B51 | 108.6 | 25 |

TABLE 17

| Battery | Discharge capacity at 10th cycle (mAh) | Discharge capacity at 11th cycle (mAh) | P (%) | Charge-discharge cycle life (cycle) |
|---|---|---|---|---|
| B43 | 940 | 790 | 84 | 420 |
| B44 | 940 | 790 | 84 | 490 |
| B45 | 940 | 790 | 84 | 550 |
| B46 | 940 | 790 | 84 | 580 |
| B5  | 940 | 780 | 83 | 600 |
| B47 | 940 | 780 | 83 | 600 |
| B48 | 930 | 760 | 82 | 600 |

TABLE 17-continued

| Battery | Discharge capacity at 10th cycle (mAh) | Discharge capacity at 11th cycle (mAh) | P (%) | Charge-discharge cycle life (cycle) |
|---|---|---|---|---|
| B49 | 920 | 750 | 81 | 600 |
| B50 | 880 | 700 | 79 | 600 |
| B51 | 840 | 650 | 77 | 600 |

As Table 17 shows, alkaline storage batteries B5 and B45–B49 had large proportions P and long charge-discharge cycle lives, while alkaline storage batteries B43 and B44 had shorter charge-discharge cycle lives due to poor formation of the outer layer. Alkaline storage batteries B50 and B51 had smaller discharge capacity due to smaller nickel hydroxide content. From these results it is preferred, in Second Electrode, that the proportion of cobalt atoms in the outer shell layer to the composite particle is 1–20% by weight.

In accordance with the present invention, there are provided a non-sintered nickel electrode for alkaline storage batteries which has a high active material utilization rate not only when charged at normal temperatures but also when charged at high temperatures, and excels in charge-discharge characteristics, and an alkaline storage battery including the non-sintered nickel electrode as its positive electrode.

What is claimed is:

1. A non-sintered nickel electrode for an alkaline storage battery comprising an active material powder made up of composite particles each comprising a nickel hydroxide-containing core particle and a shell layer coating the nickel hydroxide-containing core particle, the shell layer containing a bismuth-containing compound.

2. The non-sintered nickel electrode for an alkaline storage battery according to claim 1, wherein the bismuth-containing compound is a composite hydroxide or composite oxide of bismuth and cobalt.

3. The non-sintered nickel electrode for an alkaline storage battery according to claim 2, wherein the composite hydroxide or composite oxide of bismuth and cobalt is a sodium-containing composite hydroxide or sodium-containing composite oxide of bismuth and cobalt prepared by adding an aqueous solution of sodium hydroxide to a sodium-free composite hydroxide or sodium-free composite oxide of bismuth and cobalt to obtain a mixture and heat-treating the mixture in the presence of oxygen.

4. The non-sintered nickel electrode for an alkaline storage battery according to claim 2, wherein the proportion of bismuth atoms to cobalt atoms in the composite hydroxide or composite oxide of bismuth and cobalt is 5–50% by weight.

5. The non-sintered nickel electrode for an alkaline storage battery according to claim 2, wherein the proportion of the total amount of bismuth and cobalt atoms in the shell layer to the composite particle is 1–20% by weight.

6. The non-sintered nickel electrode for an alkaline storage battery according to claim 1, wherein the bismuth-containing compound is a hydroxide or oxide of bismuth, and cobalt metal, cobalt monoxide, cobalt hydroxide, cobalt oxyhydroxide or a sodium-containing cobalt compound prepared by adding an aqueous solution of sodium hydroxide to cobalt metal, cobalt monoxide, cobalt hydroxide or cobalt oxyhydroxide to obtain a mixture and heat-treating the mixture in the presence of oxygen is added to the active material powder.

7. The non-sintered nickel electrode for an alkaline storage battery according to claim 6, wherein the proportion of bismuth atoms in the shell layer to the composite particle is 0.1–20% by weight.

8. The non-sintered nickel electrode for an alkaline storage battery according to claim 6, wherein the proportion of cobalt metal, cobalt monoxide, cobalt hydroxide, cobalt oxyhydroxide or the sodium-containing cobalt compound in terms of cobalt atoms to the active material powder is 1–27% by weight.

9. A non-sintered nickel electrode for an alkaline storage battery comprising an active material powder made up of composite particles each comprising a nickel hydroxide-containing core particle, an inner shell layer coating the nickel hydroxide-containing core particle and an outer shell layer coating the inner shell layer, the inner shell layer containing a bismuth-containing compound and the outer shell layer containing cobalt metal, cobalt monoxide, cobalt hydroxide, cobalt oxyhydroxide or a sodium-containing cobalt compound prepared by adding an aqueous solution of sodium hydroxide to cobalt metal, cobalt monoxide, cobalt hydroxide or cobalt oxyhydroxide to obtain a mixture and heat-treating the mixture in the presence of oxygen.

10. The non-sintered nickel electrode for an alkaline storage battery according to claim 9, wherein the bismuth-containing compound is a composite hydroxide or composite oxide of bismuth and cobalt.

11. The non-sintered nickel electrode for an alkaline storage battery according to claim 10, wherein the composite hydroxide or composite oxide of bismuth and cobalt is a sodium-containing composite hydroxide or sodium-containing composite oxide of bismuth and cobalt prepared by adding an aqueous solution of sodium hydroxide to a sodium-free composite hydroxide or sodium-free composite oxide of bismuth and cobalt to obtain a mixture and heat-treating the mixture in the presence of oxygen.

12. The non-sintered nickel electrode for an alkaline storage battery according to claim 10, wherein the proportion of bismuth atoms to cobalt atoms in the composite hydroxide or composite oxide of bismuth and cobalt is 5–50% by weight.

13. The non-sintered nickel electrode for an alkaline storage battery according to claim 10, wherein the proportion of the total amount of bismuth and cobalt atoms in the shell layer to the composite particle is 1–20% by weight.

14. The non-sintered nickel electrode for an alkaline storage battery according to claim 9, wherein the bismuth-containing compound is a hydroxide or oxide of bismuth.

15. The non-sintered nickel electrode for an alkaline storage battery according to claim 14, wherein the proportion of bismuth atoms in the inner shell layer to the composite particle is 0.1–20% by weight.

16. The non-sintered nickel electrode for an alkaline storage battery according to claim 9, wherein the proportion of cobalt atoms in the outer shell layer to the composite particle is 1–20% by weight.

17. An alkaline storage battery the positive electrode of which is the non-sintered nickel electrode for an alkaline storage battery according to claim 1.

18. The alkaline storage battery according to claim 17, including a hydrogen-absorbing alloy electrode, a cadmium electrode, or a zinc electrode as the negative electrode thereof.

* * * * *